(12) United States Patent
Schwent et al.

(10) Patent No.: US 9,781,684 B2
(45) Date of Patent: Oct. 3, 2017

(54) METHOD AND NETWORK ENTITY FOR REDUCING INTER-NETWORK INTERFERENCE

(71) Applicant: Google Technology Holdings LLC, Mountain View, CA (US)

(72) Inventors: Dale G. Schwent, Schaumburg, IL (US); Robert T. Love, Barrington, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 285 days.

(21) Appl. No.: 14/135,150

(22) Filed: Dec. 19, 2013

(65) Prior Publication Data

US 2014/0378180 A1    Dec. 25, 2014

Related U.S. Application Data

(60) Provisional application No. 61/837,264, filed on Jun. 20, 2013.

(51) Int. Cl.
*H04W 52/24* (2009.01)
*H04W 52/14* (2009.01)
*H04W 52/28* (2009.01)

(52) U.S. Cl.
CPC ....... *H04W 52/241* (2013.01); *H04W 52/243* (2013.01); *H04W 52/146* (2013.01); *H04W 52/247* (2013.01); *H04W 52/283* (2013.01); *Y02B 60/50* (2013.01)

(58) Field of Classification Search
CPC . H04W 52/24; H04W 52/241–52/243; H04W 52/146; H04W 52/244; H04W 52/367; H04W 4/02; H04B 1/1027
See application file for complete search history.

(56) References Cited

U.S. PATENT DOCUMENTS

| 7,440,728 | B2 | 10/2008 | Abhishek et al. | |
|---|---|---|---|---|
| 8,041,379 | B2 | 10/2011 | Aaron | |
| 2004/0002346 | A1* | 1/2004 | Santhoff | G01S 5/0045 455/456.1 |
| 2008/0171565 | A1* | 7/2008 | Shan | H04W 16/14 455/501 |
| 2009/0325625 | A1 | 12/2009 | Hugl et al. | |
| 2010/0067469 | A1* | 3/2010 | Gaal | H04W 72/082 370/329 |

(Continued)

OTHER PUBLICATIONS

European Patent Office; International Search Report and Written Opinion; International Application No. PCT/US2014/043353; dated Oct. 13, 2014.

(Continued)

*Primary Examiner* — Wesley Kim
*Assistant Examiner* — Dong-Chang Shiue
(74) *Attorney, Agent, or Firm* — Faegre Baker Daniels LLP

(57) ABSTRACT

Wireless networks share UE location information in order to identify possible inter-network aggressors. If a first network determines, based on the location data it receives from a second network, that one of the first network's UEs may cause excessive interference to one or more of the second network's UEs, the first network grants A-MPR to its UE (e.g., by signaling the UE). The first network's UE can then lower its transmit power in order avoid interfering with the second network's UE.

17 Claims, 8 Drawing Sheets

(56) References Cited

U.S. PATENT DOCUMENTS

| | | | |
|---|---|---|---|
| 2010/0087148 A1 | 4/2010 | Srinivasan et al. | |
| 2010/0234040 A1* | 9/2010 | Palanki | H04L 5/0073 |
| | | | 455/452.2 |
| 2010/0330918 A1* | 12/2010 | Taghavi Nasrabadi | |
| | | | H04W 72/082 |
| | | | 455/63.3 |
| 2011/0009132 A1* | 1/2011 | Skarby | G01S 5/0263 |
| | | | 455/456.5 |
| 2011/0170431 A1 | 7/2011 | Palanki et al. | |
| 2011/0256884 A1 | 10/2011 | Kazmi et al. | |
| 2012/0039265 A1 | 2/2012 | Patel et al. | |
| 2012/0329399 A1* | 12/2012 | Tokgoz | H04W 52/243 |
| | | | 455/63.1 |

OTHER PUBLICATIONS

Motorola: "TS36.101: TP for UE Spurious emission limits", 3GPP Draft; R4-080710_TP_SPURIOUS Emission Limits, 3rd Generation Partnership Project (3GPP), Mobile Competenence Centre; vol. RAN WG4, no. Shenzhen, China; Mar. 27, 2008; Mar. 27, 2008.

* cited by examiner

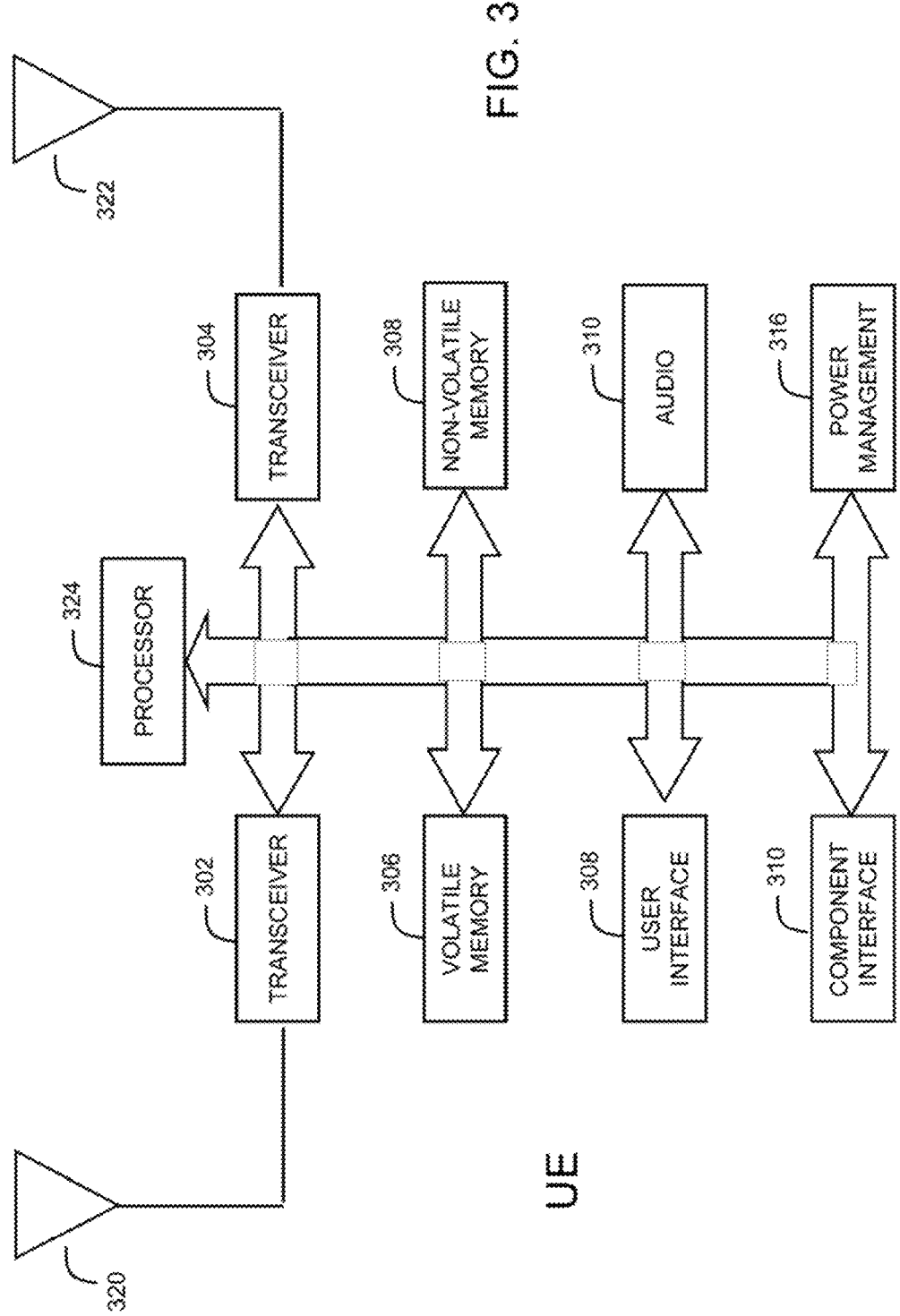

US 9,781,684 B2

METHOD AND NETWORK ENTITY FOR REDUCING INTER-NETWORK INTERFERENCE

CROSS-REFERENCE TO RELATED APPLICATIONS

The present application claims priority to U.S. Provisional Patent Application 61/837,264, filed Jun. 10, 2013.

TECHNICAL FIELD

The disclosure relates generally to wireless networking and, more particularly, to reducing inter-network interference.

BACKGROUND

In wireless communication, radio frequency ("RF") spectrum is a resource that typically gets rationed out to telecommunication providers by government agencies in each of the various jurisdictions. In 2008, for example, the United States Federal Communications Commission ("FCC") auctioned off blocks ("bands") of the spectrum to cellular service providers to be used for Long-Term Evolution ("LTE") communication. However, the FCC reserved parts of the spectrum for use by public safety agencies, Band 14 (FDD: 788-798 MHz uplink, 758-768 MHz downlink) being a well-known example. Other jurisdictions have similar set-asides for public safety.

In spite of operating on different frequencies, a User Equipment ("UE") on a commercial network often runs the risk of interfering with UEs on public safety networks. This is particularly true when the two types of networks operate on adjacent bands. For example, cellular customers on some networks use Band 13 for cellular communication. Band 13 is adjacent to a public safety band. Therefore a customer on a Band 13 networks may unknowingly interfere with public safety UE.

To prevent operators from interfering with one another, government agencies often mandate the use of guard bands, in which an operator is required to leave a buffer zone between its allocated band and the adjacent band. But because RF spectrum is a limited resource, government agencies have relaxed these guard band requirements. In the United States, for example, guard bands of 2 MHz or less are now the norm.

Having smaller guard bands has posed challenges to wireless network operators, especially when the receive frequencies of one service are spectrally near the transmit frequencies of another service. This is because wireless users are geographically unrestricted, so there will likely be many situations in which the wireless transmitter of the first operator and spectrally adjacent wireless receiver of the second operator are close to one another, e.g., one meter or less.

With such low path loss and frequency separation between the transmitting device and the receiving device, the wireless transmitter needs to be able to reduce its transmit power to avoid interfering with the nearby wireless receiver.

BRIEF DESCRIPTION OF THE DRAWINGS

FIG. 3 is an example of UE.

DESCRIPTION

Figure 1:
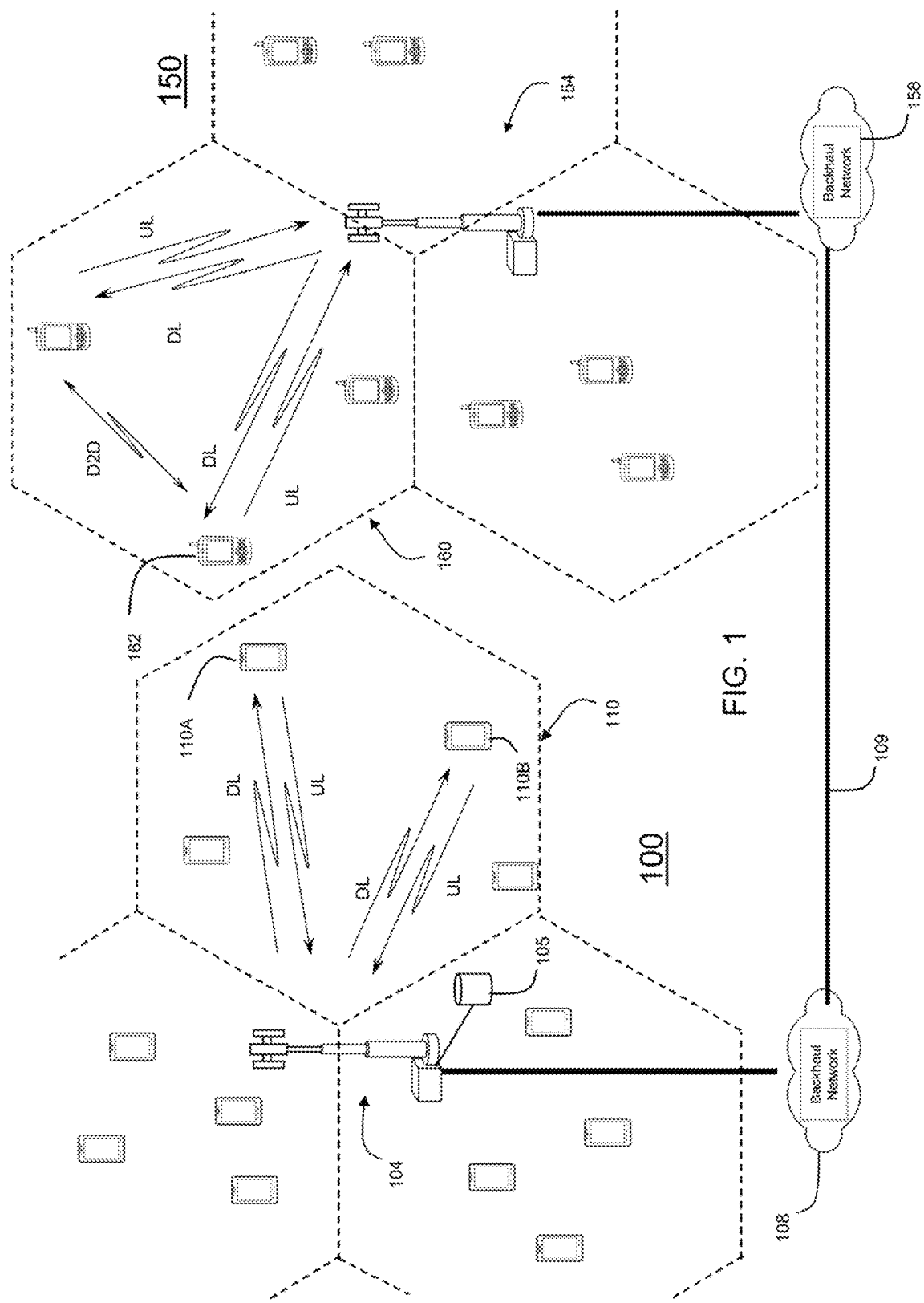
FIG. 1 shows two networks to help illustrate an embodiment.

The present disclosure is directed to a method and apparatus for reducing interference between UEs. In an embodiment of the disclosure, wireless networks share UE location information in order to identify possible inter-network aggressors. If a first network determines, based on the location data it receives from a second network, that one of the first network's UEs may cause excessive interference to one or more of the second network's UEs, the first network can grant Additional Maximum Power Reduction ("A-MPR") to its UE (e.g., by signaling the UE). The first network's UE can then lower its transmit power in order avoid interfering with the second network's UE. Once the first network determines that second network UEs are no longer in the vicinity, the first network can reduce or eliminate the A-MPR and signal this reduction or elimination to its UE. This process minimizes the interference that the first network's UEs cause to the second network's UEs while at the same time avoiding unnecessary power reduction in the first network's UEs and, consequently, maximizing the first network's performance.

In an embodiment, a UE broadcasts a beacon, which nearby UEs can use to determine the path loss to the broadcasting UE. The nearby UEs can then determine if there is a possibility of interference and, if so, if additional A-MPR should be granted.

In an embodiment, the transmit sub-bands of UEs of a cellular network (first network) are adjacent to the receive sub-bands of a public safety network (second network).

In yet another embodiment, a network entity of a first wireless network receives information regarding the location of a second UE connected a second wireless network from the second wireless network. The network entity determines the distance between the first UE and the second UE. Based on the determined distance, the network entity determines the level of interference that the first UE would cause to the second UE if the first UE transmits at a particular power. The network entity also determines an amount by which the first UE needs to reduce its transmit power in order to bring the determined interference to predetermined level. The network entity then grants the first UE permission to reduce its transmit power.

In yet another embodiment, a first UE that is connected to a first wireless network receives information indicating the location of a second UE that is connected to a second wireless network, determines (1) the distance between the first UE and the second UE based on the indicated location; (2) determines, based on the determined distance, the level of interference the first UE would cause to the second UE if the first UE transmits at a particular power, and (3) determines an amount by which the first UE would need to reduce its transmit power in order to bring the determined interference to predetermined level. The UE lowers its transmit power by the determined amount.

The relatively new technique of direct device-to-device ("D2D") communication within cellular networks presents additional challenges to avoiding interference between UEs.

In many D2D communication schemes, the network is initially involved in establishing how devices are to engage in such communication. For example, the network may allocate the appropriate radio resources to the devices, and provide information regarding the allocated resources to the devices. As with non-D2D communication, a network tries to allocate radio resources to devices engaging in D2D communication in such a way as to minimize the amount of interference experienced by neighboring devices.

However, there may be situations in which the network is unable to account for the interference that may be caused by it granting D2D resources. For example, if there are devices that are not connected to the network, but are engaged in D2D communication using the same or similar set of resources that the network allocated for D2D, then the non-network connected devices may experience interference without the knowledge of the network. One hypothetical example would be a Band 13 UE engaging in D2D communication and interfering with a nearby public safety UE. Another, similar example would be a Band 13 UE interfering with a nearby public safety UE that is engaging in D2D communication. In either case, because the Band 13 network has no knowledge of the public safety network, the Band 13 network is unable to do anything to reduce the interference.

Before going into a description of FIG. 1, certain terminology will now be explained.

As used herein, a UE is a wireless communication device capable of sending to, and receiving data from wireless communication networks and other UEs. Possible implementations of a UE include a mobile phone, a tablet computer, a laptop, and an machine-to-machine device.

The term "network entity" as used herein refers to hardware and software that operates as part of the infrastructure of a wireless network. Examples include an Evolved Universal Mobile Telecommunications System Terrestrial Radio Access ("E-UTRA") base station, an eNB, a transmission point, a remote radio head, an home evolved Node B ("eNB"), a relay node, an Institute of Electrical and Electronics Engineers ("IEEE") 802.11 access point, and an IEEE 802.16 base station.

A network entity can be made of multiple network entities. For example, two base stations may operate in conjunction with one another to operate as a single network entity. A network entity may also mean a sub-portion of another network entity. For example, a base station (a network entity) may control multiple cells, each of which is controlled by certain resources of the base station. Each set of resources (e.g., each antenna array along with the equipment that controls it) may constitute a separate network entity.

The terms "victim" and "aggressor" as used herein refer to interference among UEs. A UE is an "aggressor" when it interferes with one or more other UEs. A UE is a "victim" when it is interfered with by one or more other UEs.

Turning to the drawings, FIG. 1 shows a first wireless communication network 100 and a second wireless communication network ("network") 150. Each wireless network is configured to use one or more radio access technologies, examples of which include E-UTRA, IEEE 802.11, and IEEE 802.16. The first network 100 includes a first network entity 104, and the second network 150 includes a second network entity 154. In one embodiment, each network is an LTE network, each network entity is an eNB, and each cell is an LTE macrocell. The network entity 104 has a database 105 stored in its memory 220. The database 105 includes the location of the UEs of the second network 150. In the first network 100. The UE's shown within the first network 100 of FIG. 1 communicate first network 104 communicate with the first network entity 104 in order to send and receive data (e.g., voice data, video data, web pages, etc.) The UE's shown within the second network 150 of FIG. 1 communicate with the second network entity 154, also for sending and receiving data. The UEs of the first network 100 include a UE 110A and a UE 110B. The UEs of the second network 150 include a UE 162A and a UE 162B.

In various embodiments, each UE of FIG. 1 is capable of transmitting user data and control information to one or more of the network entities on an uplink ("UL") carrier, and receiving data and control signals from one or more of the network entities on a downlink ("DL") carrier.

Referring still to FIG. 1, the first network 100 includes a first backhaul network 108 and a second backhaul network 158. Each backhaul network includes wired and wireless infrastructure elements, such a fiber optic lines that carry signals around various parts of the network to which it is linked, including among network entities. Each backhaul network is also capable of communicating with other backhaul networks. In FIG. 1, the first backhaul network 108 is capable of communicating with the second backhaul network 158 over a dedicated bridge 109.

The second network 150 keeps track of the location of its UEs using one or more techniques such as, Global Positioning System ("GPS"), assisted GPS, multilateration, triangulation, and WiFi tracking. The second network entity 154 communicates the locations of its UEs to the first network 100. The first network entity 104 stores this information in the database 105. The second network may communicate this information periodically. The communication can be done in any number of ways, such as through a dedicated bridge 109 between the backhaul networks 107 and 158, over unlicensed spectrum such as WiFi, or across the Internet.

With the first network 100 having knowledge of both its UEs and the UEs of the second network 150, the first network 100 may calculate relative positions of each of its UEs and the UEs of the second network 150.

In an embodiment, the first network entity 104 calculates path loss between each of its UEs and each of the UEs of the second network 150. The first network entity 104 uses this path loss information to determine the interference from each of its UEs to each UE of the second network 150.

The network entity 104 and the UEs of FIG. 1 are only representative, and the number shown is intended to facilitate description. In fact, the network 100 may have many network entities, and the network entities may be in communication with many UEs. For example, if the network 100 is an LTE network, there are likely many eNBs controlling many macrocells, and many users may be moving within and between the macrocells, with their mobile devices connected to one or more of the macrocells.

In an embodiment, the UL carrier is made up of a first set of RF frequencies, while the DL carrier is made up of a second set of RF frequencies. In some embodiments, the frequencies of the UL carrier do not overlap with the frequencies of the DL carrier. The UL and DL carriers may be part of spectrum licensed for use by a regulatory body, such as the FCC. The UL and DL carriers may also be assigned for un-licensed use by the regulatory body.

In one embodiment, at least one of the UL carrier and DL carrier is made up of a single block of contiguous frequencies. In another embodiment, at least one of the UL carrier and DL carrier is made up of multiple, non-overlapping blocks of contiguous frequencies.

Referring again to FIG. 1, in an embodiment, the network entity 104 initiates D2D communication by allocating the appropriate time-frequency resources to the UEs 110A and 110B, which the UEs can use to communicate with one another; signaling information about the allocated resources to the UEs; and ordering the UEs to communicate directly with one another using the allocated resources. One or both of the UEs may be in idle mode at the time the D2D communication is initiated, but are already camped, so that they are known to network entity.

The time-frequency resources allocated to the UEs may be a subset of the resources of the UL carrier, or may be a subset of the resources of the DL carrier. For example, the network entity may allocate one or more resource blocks of a UL subframe or a DL subframe. These allocated resource blocks may occur periodically, such as every frame, subframe, or slot.

For example, assume that UE 110A and UE 110B begin a D2D session. Using the RBs allocated to them for D2D, UE 110A and UE 110B create a data stream, which, for example, is structured as a series of time-multiplexed subframes or slots, in which each subframe or slot uses one resource block ("RB") of the UL carrier or the DL carrier. The RBs of the UL or DL carriers that the UEs use may be on any subcarrier of the UL or DL carrier. In certain embodiments, however, the RBs used by the UEs are taken from the UL carrier. These RBs are selected from the physical uplink control channel of the UL carrier and are thus located at the highest and lowest frequency subcarriers of the UL carrier.

The carrier from which a resource is allocated for UE 110A and UE 110B D2D is a first carrier. The carrier that UE 110A or UE 110B uses to communicate with the network entity 104 is a second carrier. Furthermore, the UE 110A and UE 110B may communicate in D2D mode using a third carrier that does not overlap with either the first or second carriers.

Figure 2:
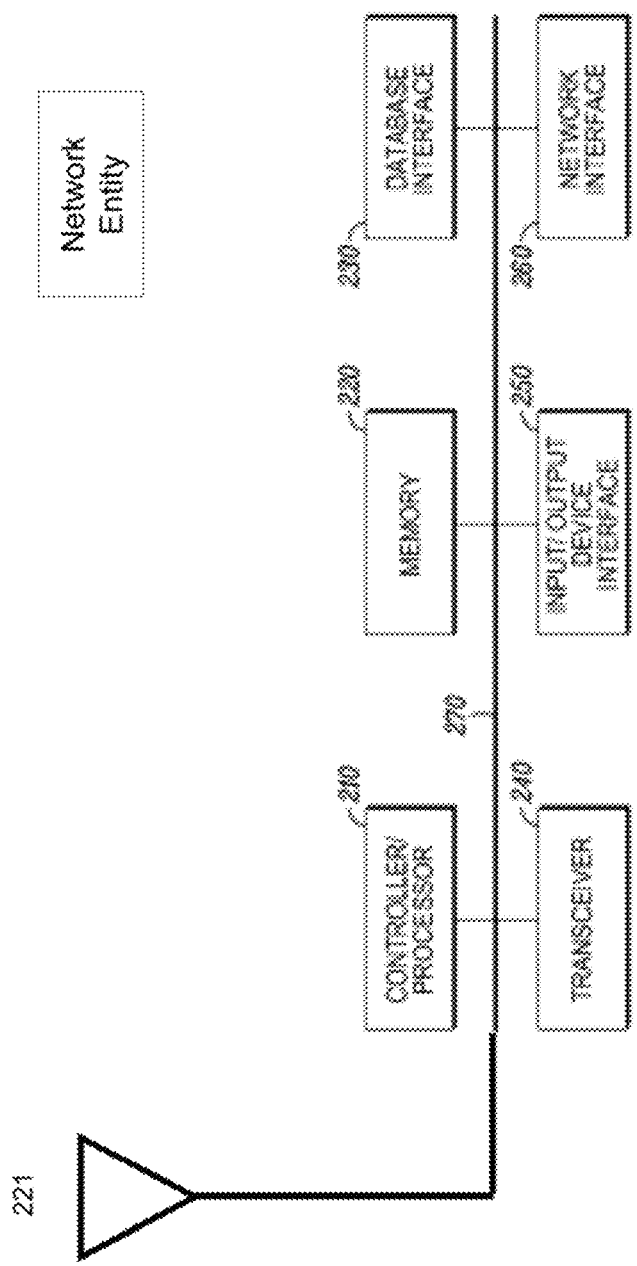
FIG. 2 is an example of a network entity.

FIG. 2 illustrates an implementation of a network entity, such as network entity 104 or network entity 154 (from FIG. 1). In this implementation, the network entity 104 includes a controller/processor 210, a memory 220, a database interface 230, a transceiver 240, input/output ("I/O") device interface 250, a network interface 260, and one more antennas, represented by antenna 221. Each of these elements is communicatively linked to one another via one or more data pathways 270. Examples of data pathways include wires, conductive pathways on a microchip, and wireless connections.

During operation of the network entity 104, the transceiver 240 receives data from the controller/processor 210 and transmits RF signals representing the data via the antenna 221. Similarly, the transceiver 240 receives RF signals via the antenna 221 converts the signals into the appropriately formatted data, and provides the data to the controller/processor 210. The controller/processor 210 retrieves instructions from the memory 220 and, based on those instructions, processes the received data. If needed, the controller/processor can retrieve, from a database via the database interface 230, additional data that facilitates its operation.

Referring still to FIG. 2, the controller/processor 210 can send data to other network entities of the network (e.g., network 100 or network 150 of FIG. 1) via the network interface 260, which is communicatively linked to the backhaul network 107. The controller/processor 210 can also receive data from and send data to an external device, such as an external drive, via the input/output interface 250.

The controller/processor 210 can be any programmable processor. The controller/processor 210 can be implemented, for example, as a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like.

The memory 220 can be implemented in a variety of ways, including as volatile and nonvolatile data storage, electrical, magnetic optical memories, random access memory, cache, or hard drive. Data is stored in the memory 220 or in a separate database. The database interface 230 is used by the controller/processor 210 to access a database. The database may contain formatting data that allows the UE to access the network 100 (FIG. 1).

The I/O device interface 250 may be connected to one or more input devices, such as a keyboard, mouse, pen-operated touch screen, monitor, or voice-recognition device. The I/O device interface 250 may also be connected to one or more output devices, such as a monitor, printer, disk drive, or speakers.

The network connection interface 260 may be connected to one or more devices, such as a modem, network interface card, transceiver, or any other device capable of transmitting to and receiving signals from the network 100. The network connection interface 260 can be used to connect a client device to the network 100.

According to an embodiment, the antenna 221 is one of a set of geographically collocated or proximal physical antenna elements linked to the one or more data paths 270, each having one or more transmitters and one or more receivers. The number of transmitters that the network entity 104 has is related to the number of transmit antennas that the network entity has. The network entity 104 may uses the multiple antennas to support Multiple Input Multiple Output ("MIMO") communication.

FIG. 3 is a block diagram of a UE (such as one or more of the UEs depicted in FIG. 1) according to an embodiment. The UE includes a transceiver 302, which is capable of sending and receiving data over the network 100. The transceiver is linked to one or more antennas 303 that may be configured like the one or more antennas of the network entity of FIG. 2. The UE may support MIMO.

The UE also includes a processor 324 that executes stored programs. The UE further includes a volatile memory 306 and a non-volatile memory 308. The processor 324 writes data to and reads data from the volatile memory 306 and the non-volatile memory 308. The UE includes a user input interface 308 that may include one or more of a keypad, display screen, touch screen, and the like. The UE also includes an audio interface 310 that includes a microphone and a speaker. The UE also includes a component interface 310 to which additional elements may be attached. Possible additional elements include a universal serial bus (USB) interface. Finally, the UE includes a power management module 316. The power management module, under the control of the processor 304, controls the amount of power used by the transceiver 302 to transmit signals.

During operation, the transceiver 302 receives data from the processor 324 and transmits RF signals representing the data via the antenna 320. Similarly, the transceiver 302 receives RF signals via the antenna 320, converts the signals into the appropriately formatted data, and provides the data to the processor 324. The processor 324 retrieves instructions from the non-volatile memory 308 and, based on those instructions, provides outgoing data to, or receives incoming data from the transceiver 302. If needed, the processor 324 can use the volatile memory 306 to cache or de-cache data and instructions that the processor 324 requires to perform its functions.

In an embodiment, the user interface 308 includes a display screen, such as a touch-sensitive display, that displays, to the user, the output of various application programs executed by the processor 324. The user interface 308 additionally includes on-screen buttons that the user can press in order to cause the UE to respond. The content shown on the user interface 308 is generally provided to the user interface at the direction of the processor 324. Similarly, information received through the user interface 308 is provided to the processor 324, which may then cause the UE to carry out a function whose effects may or may not necessarily be apparent to a user.

In an LTE embodiment, the modulation scheme used for communication between the network entity 104 and the UEs differs depending on whether the signals are being sent in the UL direction (travelling from a UE to a network entity) or in the DL direction (travelling from a network entity to a UE). The modulation scheme used in the DL direction is a multiple-access version of Orthogonal Frequency-Division Multiplexing ("OFDM") called Orthogonal Frequency-Division Multiple Access. In the UL direction, Single Carrier Frequency Division Multiple Access or Discrete Fourier Transform Spread OFDM is typically used. The bandwidth of an LTE UL or DL carrier varies depending upon whether Carrier Aggregation ("CA") is being used (e.g., up to 20 MHz without CA, or up to 100 MHz with CA).

Figure 4A:
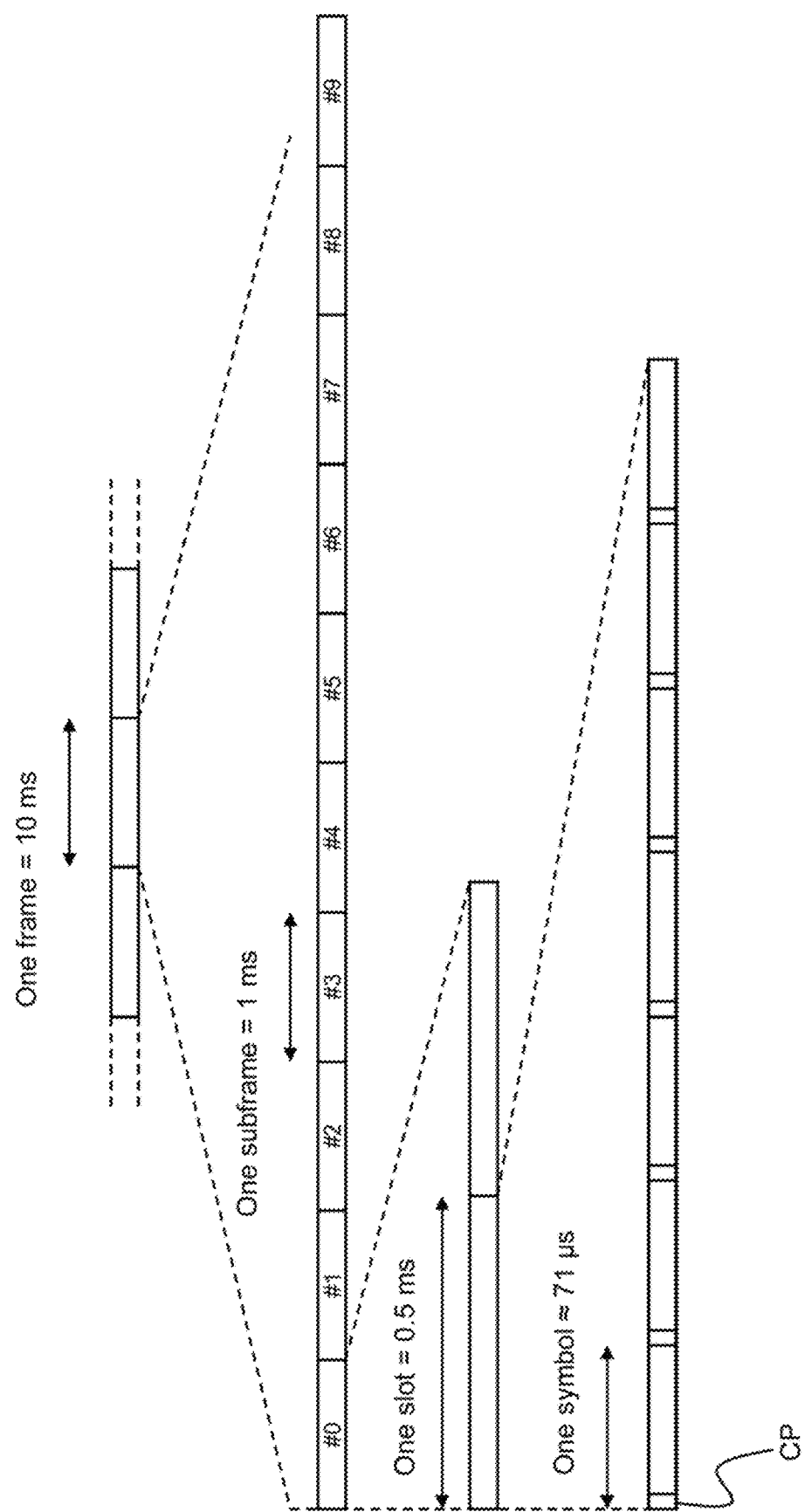
FIG. 4A is an example of a radio frame.
Figure 4B:
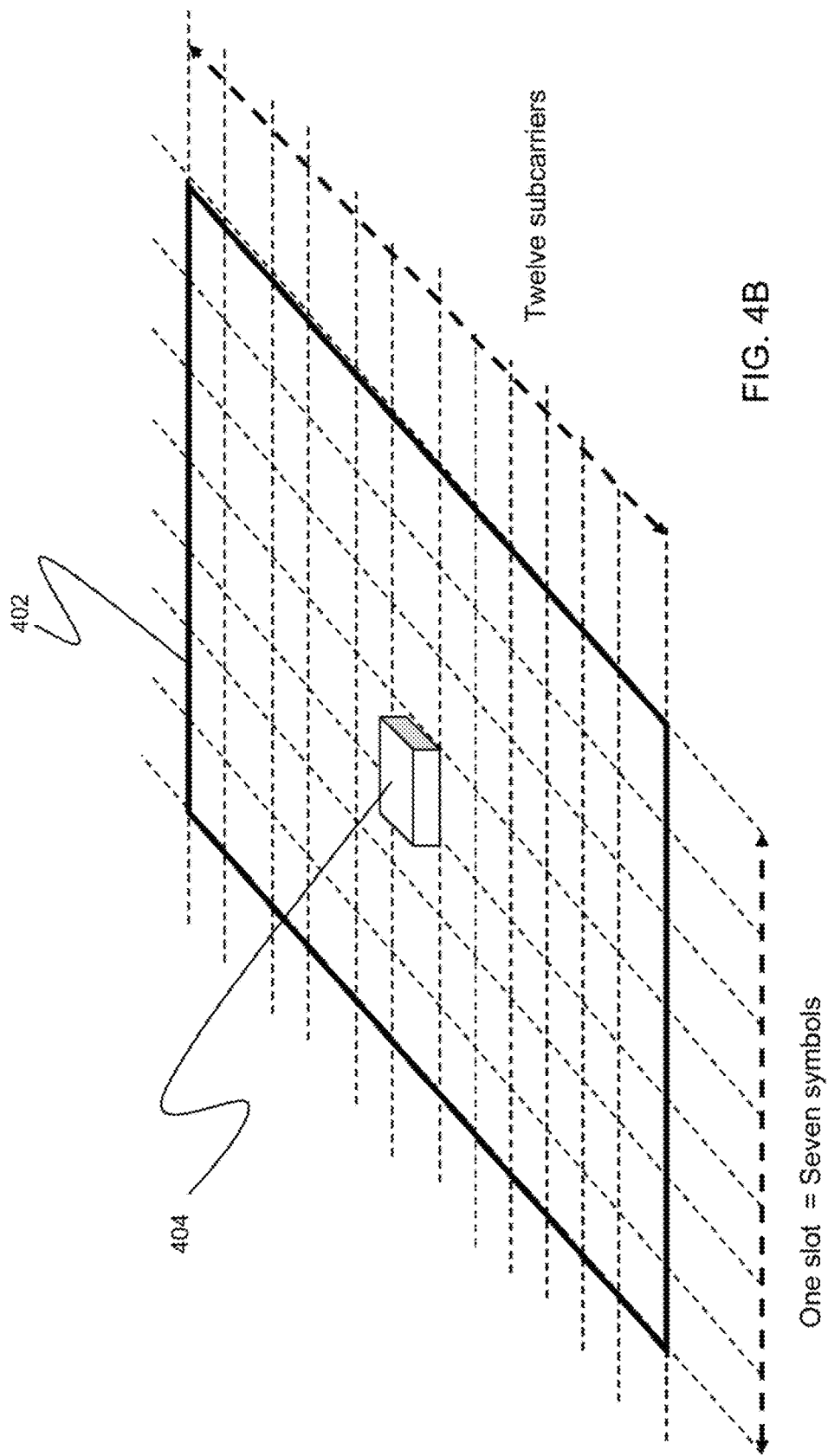
FIG. 4B is an example of a resource block.

Referring to FIG. 4A, an LTE frame structure used for carrying data between the UEs and the network entities on both UL carriers and DL carriers according to an embodiment will now be described. In LTE, both UL and DL radio frames are each 10 milliseconds (10 ms) long, and are divided into ten subframes, each of 1 ms duration. Each subframe is divided into two slots of 0.5 ms each. Each slot contains a number of OFDM symbols, and each OFDM symbol may have a Cyclic Prefix ("CP"). The duration of a CP varies according to the format chosen, but is about 4.7 microseconds in the example of FIG. 4A, with the entire symbol being about 71 microseconds. In the context of time-frequency, the subframe is divided into units of RBs, as shown in FIG. 4B. When a normal CP is used, each RB 402 is 12 subcarriers by 7 symbols (one slot). Each RB (when a normal CP is used), in turn, is composed of 84 Resource Elements ("REs") 404, each of which is 1 subcarrier by 1 symbol. However, RBs and REs may be other sizes in other embodiments. Thus, the terms RE and RB may include time-frequency resources of any size. In LTE, an RB or an RB pair is the typical unit to which resource allocations may be assigned for UL and DL communication.

Figure 5:
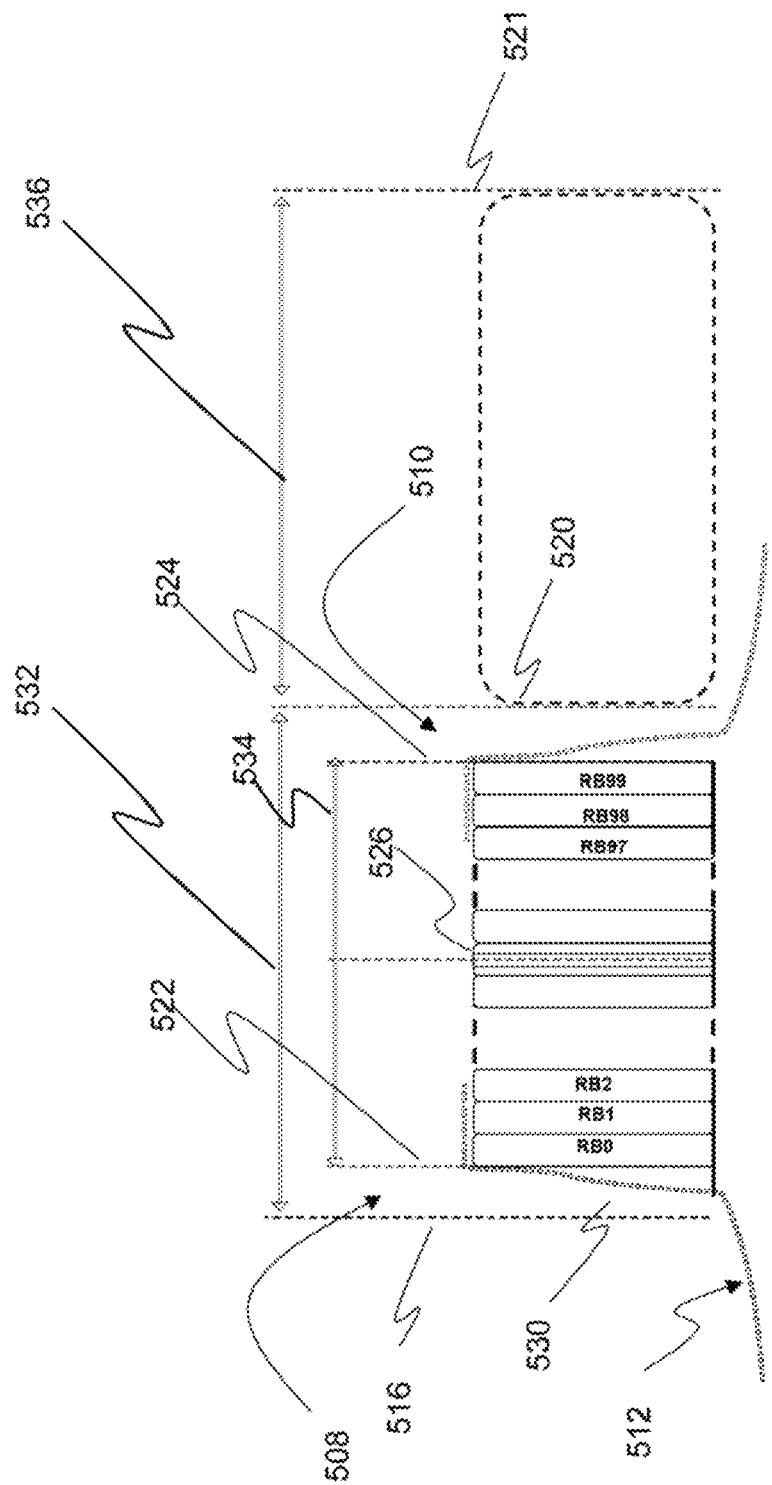
FIG. 5 depicts adjacent channels.

Referring to FIG. 5, the structure of an LTE channel will now be described. A first channel has a channel bandwidth 532 that spans a range of frequencies from a first edge 516 to a second edge 520. A second channel has a channel bandwidth 536 that spans a range of frequencies from a first edge 520 to a second edge 521. More specific details will be given regarding the first channel; however, it is to be understood that the second channel may have the same structure as the first channel.

The first channel also has a range of frequencies that make up a transmission bandwidth configuration 534. The transmission bandwidth configuration starts at a first edge 522 and ends at a second edge 524. The transmission bandwidth configuration includes multiple RBs, which are labeled RB0, RB1, etc. in FIG. 5. The transmission bandwidth configuration can be divided into sub-bands. Each sub-band has a width of one RB or two or more contiguous RBs. Between the first edge 516 of the channel bandwidth and the first edge 522 of the transmission bandwidth configuration is a first guard band 508. Between the second edge 520 of the channel bandwidth and the second edge 524 of the transmission bandwidth configuration is a second guard band 510.

Referring still to FIG. 5 the channel bandwidth 532 is the RF bandwidth supporting a single RF carrier with the transmission bandwidth configured in the uplink or downlink of a cell. The channel bandwidth is typically measured in MHz and is usually used as a reference for transmitter and receiver RF requirements. The transmission bandwidth configuration 534 is the highest transmission bandwidth permitted (e.g., according to industry standards, or government regulation) for uplink or downlink in a given channel bandwidth. In some cases (e.g., when the carrier is an E-UTRA/LTE carrier), transmission bandwidth configuration is measured in RB units.

The first channel as well as the second channel can be an UL channel or a DL channel. Similarly, each sub-band can be an UL sub-band or a DL sub-band. As used herein, two sub-bands are said to be "adjacent" to one another if there are no other sub-bands in frequencies between them. However, two sub-bands separated only by a guard band are considered to be adjacent to one another.

One of the ways in which wireless networks, such as LTE networks, balance the need for high quality UE transmissions with the need to minimize Out of Band ("OOB") emissions is through a parameter called Maximum Power Reduction ("MPR"). The purpose of MPR is to allow a UE, under certain circumstances, to lower its maximum output power in order to meet signal quality requirements and OOB emission limits. MPR is an allowance and the UE does not have to use it. In LTE, MPR is generally a function of the modulation scheme, the channel bandwidth and the transmission bandwidth (number of transmitted RBs).

In some circumstances, a network may allow a UE to lower its transmit power beyond the level allowed by MPR. This additional allowance is known as A-MPR. In LTE, the need for A-MPR occurs with certain combinations of E-UTRA bands, channel bandwidths and transmission bandwidths for which the UE must meet more stringent requirements for spectrum emission mask and spurious emissions. Like MPR, A-MPR is an allowance, not a requirement, and it applies in addition to MPR. Regardless of whether the UE makes use of the allowed MPR and A-MPR, the additional requirements for spectrum emission mask and spurious emissions that are signaled to the UE by the network still apply.

Referring to FIG. 1, various embodiments in which the network entity 104 determines whether there is acceptable/unacceptable interference between the UE 110A of the first network 100 and the UE 162A of the second network 150 will now be described. It will be assumed that the first network 100 is a consumer cellular network and the second network 150 is a public safety network. Accordingly, the UE 110A on the first network 100 will be referred to as a cellular UE and the UE 162A on the second network 150 will be referred to as a public safety ("PS") UE. Also, it is assumed that the network element 104 knows the locations and current transmit powers of all of the cellular UEs. The network element 104 assumes, for the sake of being conservative, that the cellular UEs are all transmitting at full power.

In one embodiment, to determine the extent to which cellular UE 110A is likely to interfere with a PS UE 162A, the network element 104 uses (1) the path loss between the cellular UE 110A and the PS UE 162A; and (2) the OOB emissions characteristics of the cellular UE 110A.

To determine the path loss, the network element 104 references the database 105 to determine the location of the PS UE 162A. The network element 104 then determines the distance between the two UEs. Based on this distance, the network element 104 determines the path loss between two UEs. The network element 104 may make the path loss determination by referencing a data structure (in its memory 220, FIG. 2) that contains a mapping between path loss and maximum power. This mapping may also, for example, map full power transmissions to larger losses and lower power transmissions to smaller losses.

The network element 104 may already have information regarding the OOB emissions characteristics of the cellular UE 110A (e.g., from the UE self-reporting it). Alternatively, the network element 104 may make an assumption regarding the cellular UE's OOB emissions characteristics. For example, it may assume that the cellular UE's OOB emissions are at the level specified by an industry standard (such as LTE).

The network element 104 uses the determined path loss information and the OOB emissions characteristics to determine whether the interference that the cellular UE 110A causes to the PS UE 162A is acceptable. For example, the network element 104 determines whether the interference caused by the cellular UE 110A is at a level low enough that the PS UE 162A does not see any significant loss of sensitivity—"significant" being specified, for example, by the LTE standard in terms of signal-to-noise ratio.

If the network element 104 categorizes the interference to be significant, the network element 104 signals the interference level as well as an A-MPR to the cellular UE 110A (e.g., via higher layer signaling). The cellular UE 110A determines, based on the signaled interference level, the appropriate transmit power level and A-MPR. The UE 110A then reduces its transmit power by the lesser of (1) an amount that brings its transmit power down to the appropriate level, and (2) an amount equivalent to MPR+A-MPR.

According to an embodiment, the network entity 104 can adjust the A-MPR of each cellular UE to the minimum necessary to maintain performance of the PS UEs and thereby achieve maximum throughput of cellular user data within the first network 100. In other words, if a given PS UE is experiencing an unacceptable interference from a given cellular UE, then the network entity 104 adjusts the cellular UE's A-MPR so that the cellular UE can reduce its transmit power more than it would be permitted to otherwise.

In an embodiment, the second network 150 may communicate scheduling information of the PS UEs to the first network 100. The first network 100 (e.g., the network element 104) may then schedule the cellular UEs in such a way as to prevent the cellular UEs from transmitting while in close proximity to PS UEs that are receiving. One way of scheduling the cellular UEs is to designate time-frequency resources for each cellular UE (e.g., which RBs to use, which part of each frame to use) so that the resources do not overlap with those being used by nearby PS UEs.

The above-described techniques can be applied to co-located networks with a small frequency separation between aggressor UEs and victim UEs. Examples include Band 13 LTE UEs and PS UEs, Band 7 LTE UEs and WiFi UEs, or Band 7 LTE UEs and Band 38 LTE UEs.

In some scenarios, the positions of the UEs of the first network 100 and/or the UEs of the second network 150 are unknown, or not precisely known, to their respective networks. This can occur if the UEs are out of range of their respective networks or if they are sufficiently shadowed within a structure to be out of range of GPS and/or multi-lateration techniques. One case in which this may occur is in the context of D2D communication. When using D2D, UEs might be transmitting and receiving with peers outside of their respective networks.

In one embodiment, the PS UE 154 transmits a discovery beacon. The beacon includes minimal synchronization data. The beacon may also communicate the UE's location, if the UE knows it. Since the beacon need only contain minimal data, it can be sent using relatively few OFDM subcarriers (e.g., one LTE resource block).

The cellular UE 110A determines the extent to which it is likely to interfere with PS UE 162A using (1) the path loss between the cellular UE 110A and the PS UE 162A; and (2) the OOB emissions characteristics of the cellular UE 110A.

To determine the path loss, the cellular UE 110A measures the power level of the beacon signal at its receive antenna, and compares that power level to the power level of the beacon signal transmitted from the PS UE 162A. The UE 110A may have knowledge of the beacon's transmitted strength based on, for example, an industry standard specifying the beacon strength.

The cellular UE 110A may have foreknowledge of its OOB characteristics, or it may determine its OOB characteristics directly by measuring the characteristics of its own transmissions at one of its receive antennas.

The cellular UE 110A determines whether it is likely to cause excessive interference to the PS UE 162A by comparing the path loss to a threshold or thresholds to determine the A-MPR that it needs to apply. In doing so, the UE 110A takes into account its OOB characteristics.

According to an embodiment, a D2D-capable victim UE may transmit its discovery beacon (i.e., the beacon that it uses to facilitate D2D communication) at the farthest frequency separation from the victim's band in order to reduce the victim's filtering requirements. The network could reserve subcarriers for this purpose if they would interfere with other users on the network, but that may not be necessary if the beacon power is low and the user is already outside the network. Referring to FIG. 5, the subcarriers of RB0 might be reserved for D2D discovery beacons.

The beacon subcarriers may be the same as those used for D2D discovery beacons, or may be subcarriers that are specifically reserved for the purpose of allowing potential victim UEs to be discovered by potential aggressor UEs. The beacon need not be transmitted all the time, but may be on a schedule allowing an uncoordinated aggressor's beacon receiver to detect it during the aggressor's receive period.

The transmitted beacon need not be at high power. As an example, an LTE Band 13 UE is allowed to transmit with emissions of −35 dBm/6.25 kHz (which typically happens if the UE transmits at full power) if there are no public safety impediments. Assuming a narrowband public safety bandwidth of 25 kHz, a conservative receive noise figure of 2 dB, and a typical allowance of 3 dB desense from the interfering signal, the interfering signal at the receive antenna of the PS UE may be no more than kTBF=−128 dBm/25 kHz.

That implies a path loss of 99 dB from the −35 dBm/6.25 kHz (−29 dBm/25 kHz) LTE Band 13 transmitter. Thus it would be expected that the cellular UE and the PS UE would be separated by at least that much. If the two devices are as close or closer than this, the cellular UE needs to apply A-MPR. If further, then it does not need to apply A-MPR.

In an embodiment, the power of the beacon that the PS UE transmits is chosen to be at a level that is just enough that, given the path loss between the cellular UE and the PS UE, cellular UE can detect the beacon. For example, with a typical cellular receiver specified at −94 dBm sensitivity for a 10 MHz BW, a dedicated single RB beacon receiver would have sensitivity of −111 dBm for the 180 kHz single RB. With the same 99 dB path loss, the beacon power would only need to be −12 dBm.

In an embodiment, if an aggressor UE is not already in full A-MPR, the aggressor UE will activate a receiver for listening to the victim UE's beacon.

If the aggressor UE receives a beacon that contains the victim UE's location information, the aggressor UE will adjust its A-MPR based on the received location information as well as on the aggressor UE's own position.

If the aggressor UE does not have sufficient location information regarding the victim UE, the aggressor UE may adjust its A-MPR based on the signal strength of the victim UEs beacon.

If the aggressor UE receives no beacon, then it will deem there to be no victim UEs in the vicinity. The A-MPR for the aggressor UE can be reduced or eliminated.

As described earlier, the strength of the victim UE's beacon need not be at the victim UE's maximum transmit power. If, for example, the aggressor UE knows the transmit power level of the beacon, the aggressor UE can use that value along with the value of the power level of the beacon detected at the aggressor UE to computes the path loss between it and the victim UE. The aggressor UE may then compare the path loss to a threshold or thresholds to determine the A-MPR that it needs to apply.

If there are beacons from multiple victim UEs transmitting on the same time-frequency resources, the interference from these beacons on each other might make it impossible to recover location information from one or more of the victim UEs. In that case, the aggressor UE may compute a path loss based on the aggregated power from all the victim beacons. In the case of one dominant beacon, the aggressor UE may make a conservative assumption that all beacon powers are the same as that of the dominant beacon.

In the case of multiple beacons at approximately equal power at the aggressor UE's beacon receiver, the increased total power will indicate a smaller path loss, which makes A-MPR determination (whether to use A-MPR) more conservative (more likely to enable A-MPR). Once the aggressor UE estimates the path loss, it compares the estimated path loss to a threshold or thresholds to determine the A-MPR to be applied.

In some embodiments, to avoid a too conservative A-MPR determination by the aggressor UE, discovery beacons should use resource blocks that are not also used by other UEs for transmitting user data or control data. A reserved resource block or a subcarrier at the edge of the transmission bandwidth region (or just outside it) would be one implementation.

In one embodiment, the first network entity 104 (FIG. 1) determines time-frequency resource blocks that are not being used by the UEs of the second network 150. The first network entity 104 receives this information from the second network entity 154. In addition to or in lieu of granting A-MPR to the aggressor UE, the network entity 104 may order the first UE 110A to communicate only on the determined time-frequency resource blocks.

In the following descriptions of FIG. 6 and FIG. 7 it will be assumed that one or more transmission sub-bands of the first network 100 (FIG. 1) are adjacent to one or more receive sub-bands of the second network 150. For the sake of clarity, the UE 110A will be referred to as the first UE, the UE 162A will be referred as the second UE, the UE 110B will be referred to as the third UE, and the UE 162B will be referred to as the fourth UE.

Figure 6:
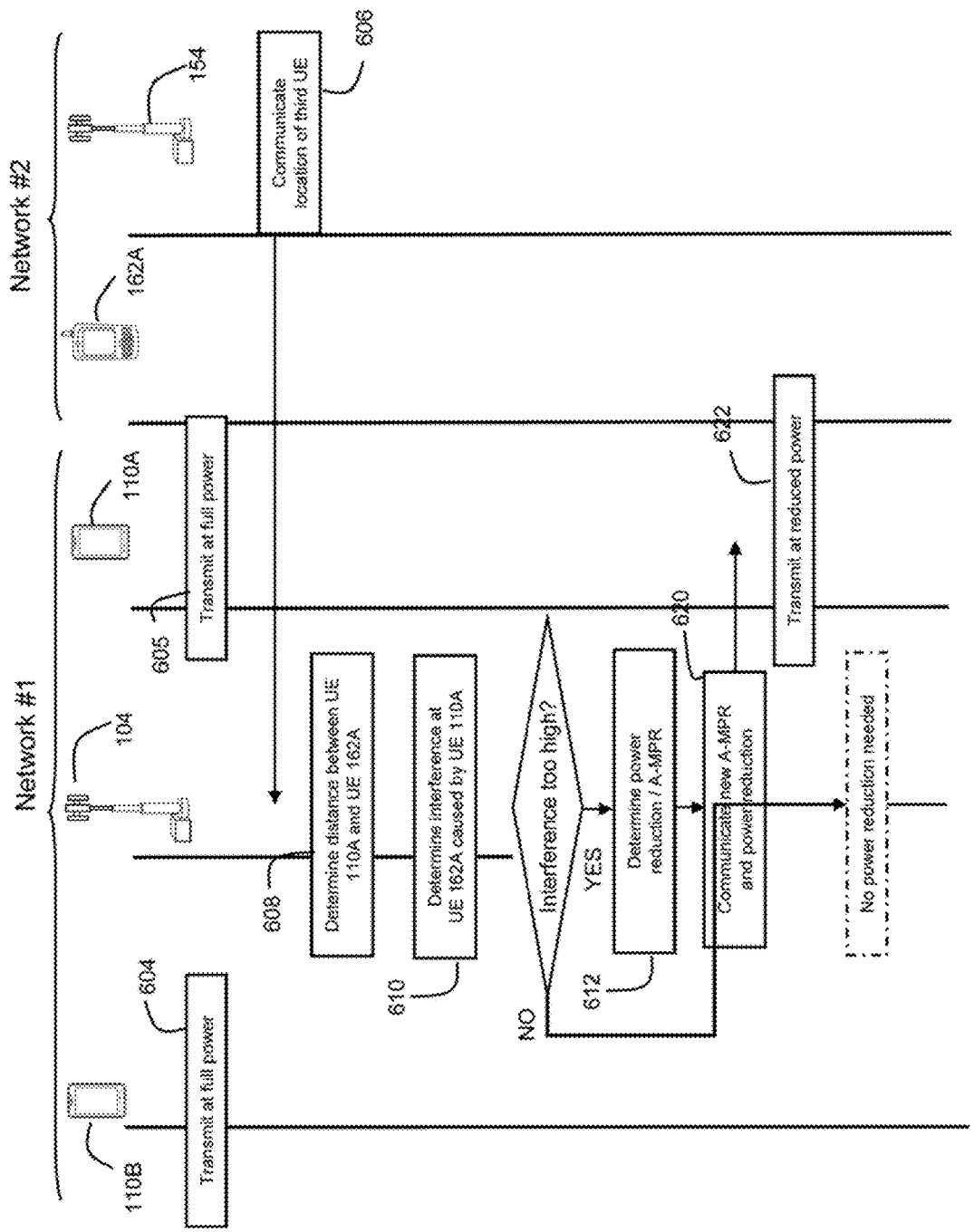
FIG. 6 illustrates a procedure that is carried out according to an embodiment.

Referring to FIG. 6, an embodiment will now be described, with appropriate reference to elements of FIG. 1. At 604 and 605, the first UE 110A and the third UE 110E each transmit at full power. At 606, the second network entity 154 informs the first network entity 104 of the location of the second UE 162A. At 608, the first network entity 104 determines, based on the information received by the second network entity 154, the distance between the first UE 110A and the second UE 162A.

At 610, the first network entity 104 determines the interference that the first UE 110A may cause the second UE 162A (as measured at the second UE 162A) if the first UE transmits at full power (or full power as reduced by MPR+ or − tolerance). If the first network entity 104 determines that the interference is not too high (as measured by OOB emission limits), then the network entity 104 allows the first UE 110A to continue transmitting at full power. The third UE 110B also continues transmitting at full power.

If, however, the first network entity 104 determines that the interference that the first UE 110A may cause the second UE 162A would be excessive if the first UE 110A transmits at full power then, at 612, the first network entity 104 determines the appropriate amount that the first UE 110A needs to reduce its transmit power, communicates an A-MPR (or increased A-MPR) (620) to the first UE 110A, and orders the first UE 110A to reduce its transmit power by the determined amount. At 622, the first UE 110A reduces its transmit power by the amount that the first network entity 104 ordered. Meanwhile, the third UE 110E continues to transmit at full power.

Figure 7:
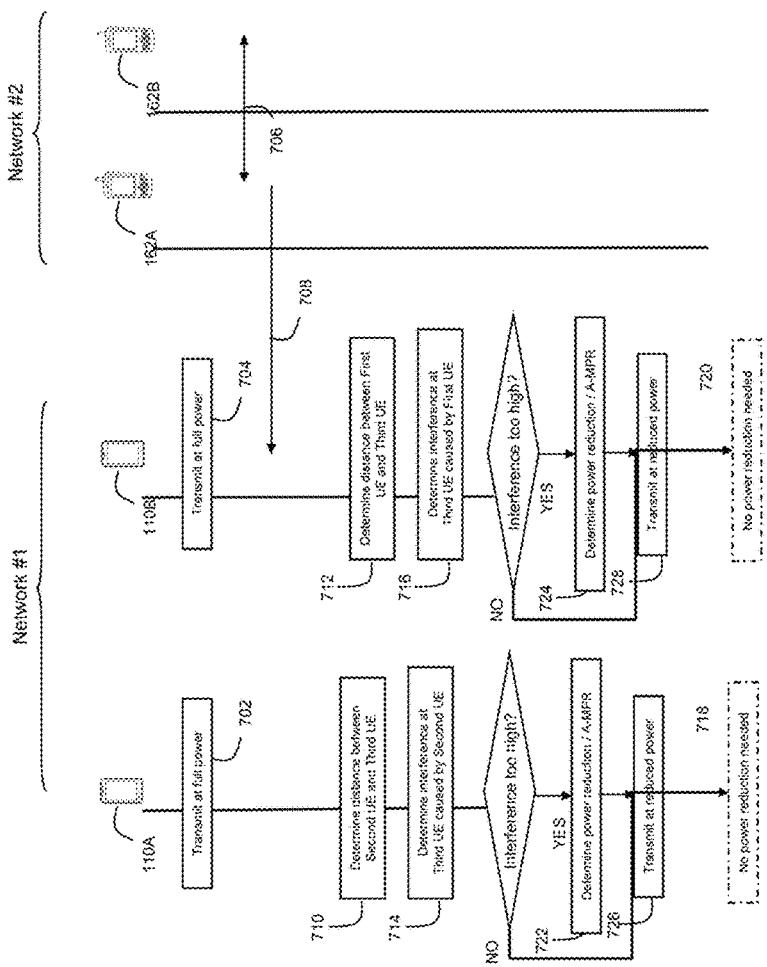
FIG. 7 illustrates a procedure that is carried out according to an embodiment.

Referring to FIG. 7, another embodiment will now be described, with appropriate reference to elements of FIG. 1. At 702 and 704, the first UE 110A and the third UE 110E each transmit at full power, while the second UE 162A and the fourth UE 162B engage in D2D communication with one another (706). At 708, the second UE 162A broadcasts a discovery beacon that contains information regarding the location of the third UE, which the first UE 110A and third UE 110E receive.

At 710 and 712, each of the first and third UEs 110A and 110E determine, based on the information received via the second UE 162A, the distance between itself and the second UE 162A. At 714 and 716, the first UE 110A and third UE 110E each determine the interference that it may cause to the second UE 162A (as measured at the second UE 162A). If the (first or third) UE determines that the interference is not too high, the first and third UEs 110A and 110E continue to transmit at full power (718, 720).

If, however, if either the first UE 110A or third UE 110E determines that the interference that it may cause to the second UE 162A is too high, each of the first UE 110A and the second UE 11B determines the appropriate amount that that it needs to reduce its transmit power, as well as the A-MPR that is commensurate with the power reduction amount (722 and 724). One or both the first UE 110A and third UE 110E may then transmit at the reduced power (726 and 728).

It can be seen from the foregoing that a method and network entity for reducing inter-network interference have been provided. The terms, descriptions and figures used herein are set forth by way of illustration only and are not meant as limitations.

For example, interactions between UEs and between UEs and the network entities are often described as occurring in a particular order. However, any suitable communication sequence may be used.

What is claimed is:

1. A method, on a network entity of a first wireless network, the method comprising:
   communicating, by the network entity, with a first User Equipment, UE, that is connected to the first wireless network;
   receiving, by the network entity, from a second wireless network, information regarding the location of a second UE connected to the second wireless network;
   determining, by the network entity, the distance between the first UE and the second UE based on the received location information and location information for the first UE;
   based on the determined distance, determining by the network entity, the level of interference that the first UE would cause to the second UE if the first UE transmits at a first power level;
   determining, by the network entity, an amount by which the first UE needs to reduce its transmit power in order to bring the determined interference to a predetermined level; and
   signaling, by the network entity, to the first UE, the determined amount for granting the first UE permission to reduce its transmit power by the determined amount.

2. The method of claim 1, wherein determining the level of interference comprises:
   determining the path loss of signals transmitted from the first UE to the second UE; and
   determining the out of band emissions characteristics of the first UE.

3. The method of claim 1, wherein a transmission sub-band of the first UE is adjacent to a reception sub-band of the second UE.

4. The method of claim 1, wherein the signaled determined amount is the maximum amount of transmit power that the first UE is permitted to reduce.

5. The method of claim 1, further comprising:
   determining a second amount by which the first UE would need to reduce its transmit power in order to bring the determined interference to predetermined level; and
   signaling the second transmit power reduction amount to the first UE.

6. The method of claim 1, wherein frequencies used for UEs to communicate on the first network do not overlap with those used by UEs to communicate on the second network.

7. The method of claim 1, further comprising:
   determining time-frequency resource blocks that are not being used by the second UE;
   ordering the first UE to communicate only on the determined time-frequency resource blocks.

8. A method, on a first User Equipment UE, connected to a first wireless network, the method comprising:
   detecting a beacon signal of a second UE that is connected to a second wireless network;
   determining the distance between the first UE and the second UE based on the beacon signal;
   based on the determined distance, determining the level of interference the first UE would cause to the second UE if the first UE transmits at a first power level;
   determining an amount by which the first UE would need to reduce its transmit power in order to bring the determined interference to a predetermined level; and
   lowering the transmit power of the first UE by the determined amount to a second transmit power level.

9. The method of claim 8, further comprising:
   determining, based on the determined distance, the path loss of signals transmitted from the first UE to the second UE,
   wherein the level of interference is determined based at least in part on the determined path loss.

10. The method of claim 9, wherein determining the level of interference further comprises:
    determining the path loss of signals transmitted from the first UE to the second UE based on the out of band emissions characteristics of the first UE.

11. The method of claim 8, wherein a transmission sub-band of the first UE transmits is adjacent to a reception sub-band of the second UE.

12. The method of claim 8, wherein the beacon signal includes information about the location of the second UE.

13. The method of claim 8, wherein the beacon signal only contains synchronization data.

14. A network entity, configured to operate as part of a first wireless network, the network entity comprising:
    a network interface configured to:
    receive, via a backhaul network, signals from a second wireless network; and
    wherein the signals contain information indicating the location of a second User Equipment UE, of the second wireless network; and
    a processor communicatively linked to the network interface and configured to:
    receive the location information via the network interface;
    determine the distance between a first UE of the first wireless network and the second UE of the second wireless network based on the location information;
    based on the determined distance, determine the level of interference the first UE causes to the second UE if the first UE transmits at a first power level;
    determine an amount by which the first UE needs to reduce its transmit power in order to bring the determined interference to an acceptable level; and
    signal, to the first UE, the determined amount for granting the first UE permission to reduce its transmit power by the determined amount.

15. The network entity of claim 14, wherein the processor determines the level of interference further based on the out-of-band emissions characteristics of the first UE.

16. The network entity of claim 14, wherein a transmission sub-band on which the first UE transmits is adjacent to a reception sub-band of the second UE.

17. The network entity of claim 14, wherein the processor is configured to determine a maximum transmit power reduction amount based on the determined transmit power amount, wherein the determined transmit power amount is less than the determined maximum transmit power reduction amount.

* * * * *